G. F. SPROULL.
MACHINE FOR EXTERMINATING BOLL WEEVIL.
APPLICATION FILED JAN. 3, 1918.
1,285,826. Patented Nov. 26, 1918.
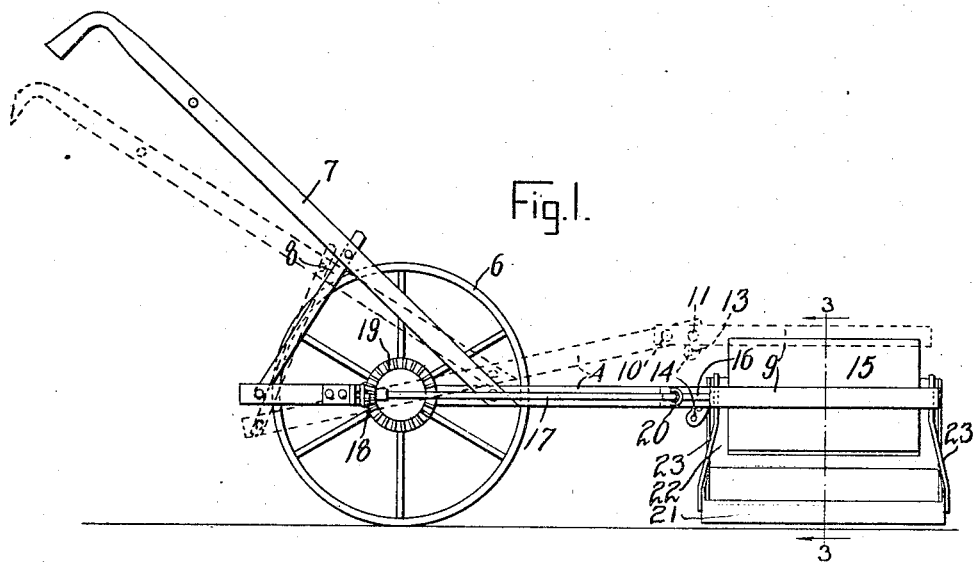
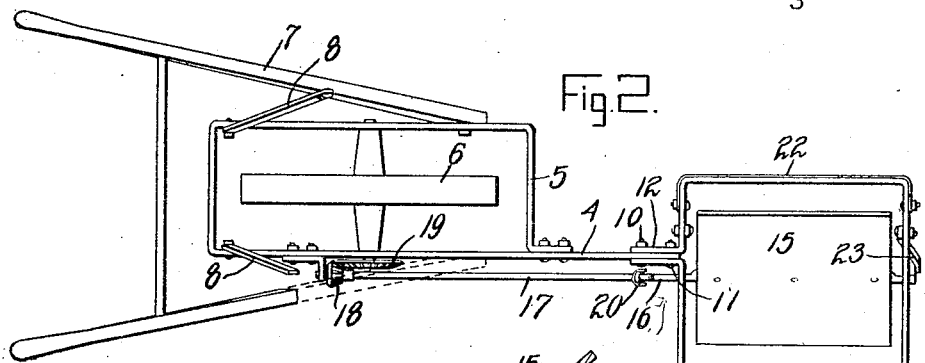
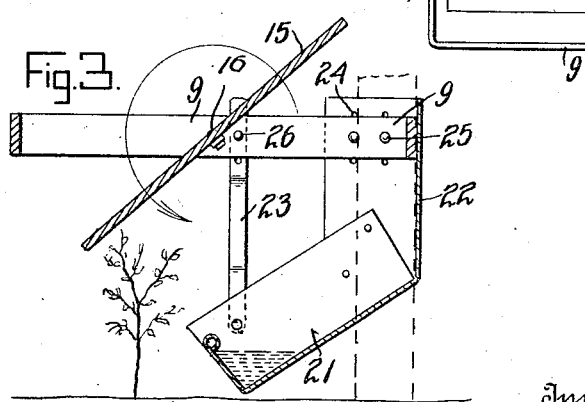
Inventor
George F. Sproull.
By Bedford & Doolittle
Attorneys

UNITED STATES PATENT OFFICE.

GEORGE FORREST SPROULL, OF MEMPHIS, TENNESSEE.

MACHINE FOR EXTERMINATING BOLL-WEEVIL.

1,285,826.  Specification of Letters Patent.  Patented Nov. 26, 1918.

Application filed January 3, 1918. Serial No. 210,114.

*To all whom it may concern:*

Be it known that I, GEORGE FORREST SPROULL, a citizen of the United States, residing at Memphis, Shelby county, and State of Tennessee, have invented and discovered certain new and useful Improvements in Machines for Exterminating Boll-Weevil, of which the following is a specification.

My said invention relates to machines for exterminating the boll-weevil, and consists in the combinations and arrangements of elements hereinafter described and particularly set forth in the accompanying claims.

The invention has for its purpose to provide a machine which will be adapted particularly for working very small cotton plants and which is designed to be effectively used within an appreciable range of elevations on such plants during the actual working of the machine.

A further purpose of the invention resides in providing a machine of this character having mechanical adjusting means to the end that the apparatus may be suited to the particular requirements of the foliage of the cotton plants, and for other conditions that may arise.

It is further proposed to provide a boll weevil machine which will act upon cotton plants in an early state of their development, *i. e.*, before the squares are formed, in a manner that will effectively remove the weevils therefrom and precipitate them into a trough containing a substance that will kill the pests.

The invention is shown in the accompanying drawings wherein:

Figure 1 is a side elevational view of the machine;

Fig. 2, a top plan view thereof, with parts removed to show the driving gear, and Fig. 3, a transverse sectional view taken on the line 3—3 of Fig. 1.

Referring to the construction in further detail and wherein like reference characters designate corresponding parts in the different views shown, the machine consists of a frame 4 having a rectangular portion 5 within which is suitably journaled a single tractor wheel 6 of appropriate form, and a pair of operating handles 7 are secured to the frame section 5 and braced thereon by the pair of bars 8, in such a way that the machine may be used after the manner of a simple harvester or plow.

A second rectangular frame portion 9 is secured to the frame part 4 by the pivot pin 10 and said connection is rendered adjustable to the end that the frame 9 may be set to operate at different levels. The adjusting device consists of a bolt 11 that passes through the connecting members 12 of the frame 9 (see Fig. 1) and in one of the apertures 13 formed in the angular extension 14 on the end of the frame 4, as shown. With this arrangement it will be evident that the frame 9 may be set to obtain the required horizontal position when the handles 7 are in different positions, as indicated by the view shown in broken lines in Fig. 1.

A beater or "flutter wheel" 15 is mounted on the shaft 16, suitably journaled in the frame 9, and said "flutter wheel" is connected to be operated through the travel of the vehicle wheel 6 by the driven shaft 17 carrying a gear wheel 18 that meshes with a gear wheel 19 secured to the axle of the tractor wheel (see Fig. 2). A knuckle joint 20 connects the shaft members 16 and 17 to allow the "flutter wheel" to be operated irrespective of the level to which the frame 9 may be set.

A trough 21, constructed of sheet metal, is secured to one side of the frame 9 by a side extended portion 22 and said trough 21 is disposed at an angle to give the necessary clearance for the operation of the "flutter wheel" 15. A pair of straps or hangers 23 support the lower and outer end of the trough 21 from the front and rear of the frame portion 9 and said trough is also rendered adjustable by means of several apertures 24 that receive the pair of securing bolts 25. The supporting bolts 26 for the straps 23 are in like manner adjustable, as shown.

In operation the machine is moved along the row of cotton plants with the frame 9 at the necessary elevation, and the cotton plants are subjected to the action of the "flutter wheel" in such a manner that the boll weevils thereon are precipitated into the coal oil or other detergent contained in the trough, and in actual working the relation of the parts and manner of treating the cotton plants are substantially as illustrated in Fig. 3.

It is obvious that those skilled in the art may vary the details of construction and arrangement of parts without departing from the spirit of the invention and therefore I do not wish to be limited to such features except as may be required by the claims.

Having thus described my invention, what I claim as new and desire to secure by U. S. Letters Patent, is:

1. In an apparatus of the character described, the combination of a frame comprising a pivotally connected front and rear portion, said front portion being angularly adjustable for operating at different levels, a single supporting and tractor wheel journaled in the frame at the rear end portion, a flutter wheel journaled within the adjustable frame portion, a trough dependingly and adjustably mounted on said adjustable frame portion adjacent the flutter wheel, and a driving connection having a knuckle joint between said tractor wheel and the flutter wheel, substantially as set forth.

2. In an apparatus of the character described, the combination of a frame having two rectangular portions disposed respectively forwardly and rearwardly and having pivotal adjustable connection for operating at different elevations, a single supporting and tractor wheel journaled in the rear rectangular frame portion, a flutter wheel journaled to operate in the front rectangular frame portion, a trough dependingly and adjustably mounted in the frame portion immediately adjacent said flutter wheel and adapted to contain an exterminator, and a driving connection having a knuckle joint between said tractor wheel and the flutter wheel, substantially as set forth.

In witness whereof, I have hereunto set my hand and seal at Memphis, Tennessee, this 31st day of December, A. D. nineteen hundred and seventeen.

GEORGE FORREST SPROULL. [L. S.]

Witnesses:
 E. W. HALE,
 C. E. M. COLMON.

Copies of this patent may be obtained for five cents each, by addressing the "Commissioner of Patents, Washington, D. C."